(12) United States Patent
Ostrowski et al.

(10) Patent No.: US 7,528,288 B2
(45) Date of Patent: May 5, 2009

(54) METHOD FOR PRODUCTION OF POLYETHER ALCOHOLS

(75) Inventors: Thomas Ostrowski, Mannheim (DE); Achim Loeffler, Speyer (DE); Raimund Ruppel, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/997,589

(22) PCT Filed: Aug. 21, 2006

(86) PCT No.: PCT/EP2006/065472

§ 371 (c)(1),
(2), (4) Date: Feb. 1, 2008

(87) PCT Pub. No.: WO2007/025881

PCT Pub. Date: Mar. 8, 2007

(65) Prior Publication Data

US 2008/0161509 A1    Jul. 3, 2008

(30) Foreign Application Priority Data

Aug. 30, 2005 (DE) ................. 10 2005 041 142

(51) Int. Cl.
*C07C 43/00* (2006.01)
(52) U.S. Cl. ..................................... 568/620; 568/621
(58) Field of Classification Search ................ 568/620, 568/621
See application file for complete search history.

(56) References Cited

U.S. PATENT DOCUMENTS

| 5,144,093 | A | 9/1992 | Reisch et al. |
| 5,648,559 | A | 7/1997 | Hager |
| 6,362,126 | B1 | 3/2002 | Grosch et al. |
| 2002/0183482 | A1 | 12/2002 | Harre et al. |

FOREIGN PATENT DOCUMENTS

| DE | 203 734 | | 11/1983 |
| DE | 203 735 | | 11/1983 |
| DE | 275 695 | A1 | 1/1990 |
| WO | WO 97/29146 | | 8/1997 |
| WO | WO 98/03571 | | 1/1998 |
| WO | WO 99/44739 | | 9/1999 |
| WO | WO 00/14143 | | 3/2000 |
| WO | WO 01/16209 | A1 | 3/2001 |
| WO | WO 01/44347 | A1 | 6/2001 |

*Primary Examiner*—Sikarl A Witherspoon
(74) *Attorney, Agent, or Firm*—Oblon, Spivak, McClelland, Maier & Neustadt, P.C.

(57) ABSTRACT

The invention provides a process for preparing polyether alcohols by adding alkylene oxides onto H-functional starter substances using DMC catalysts, which comprises, in a first step, adding propylene oxide or a mixture of propylene oxide and ethylene oxide onto H-functional starter substances and, in a second step, transferring the product thus formed into a tubular reactor in which mixtures of ethylene oxide and propylene oxide are metered in at least two metering points, the proportions of ethylene oxide and propylene oxide in the mixtures metered in in the first and in the second step being different, the proportions of ethylene oxide and propylene oxide in the mixtures metered in at least two metering points in the second step being different, and the mixture metered in in the second step, at least at the last metering point, comprising at least 40% by weight of ethylene oxide.

17 Claims, No Drawings

METHOD FOR PRODUCTION OF POLYETHER ALCOHOLS

The invention provides a process for preparing polyether alcohols using DMC catalysts.

Polyether alcohols are important feedstocks in the preparation of polyurethanes. They are prepared usually by catalytic addition of lower alkylene oxides, especially ethylene oxide and/or propylene oxide, onto H-functional starters.

The catalysts used are usually soluble basic metal hydroxides or salts, potassium hydroxide having the greatest significance in practice. A particular disadvantage in the use of potassium hydroxide as a catalyst is that, in the preparation of high molecular weight polyether alcohols, there is the formation of unsaturated by-products which lower the functionality of the polyether alcohols and become very disadvantageously noticeable in the preparation of polyurethanes.

To lower the content of unsaturated fractions in the polyether alcohols and to increase the reaction rate in the addition of propylene oxide, the use of multimetal cyanide compounds, preferably double metal cyanide compounds, especially zinc hexacyanometalates, as catalysts is known. These catalysts are frequently also referred to as DMC catalysts. There is a large number of publications in which such compounds have been described.

The polyether alcohols prepared using multimetal cyanide compounds feature a very low content of unsaturated constituents. A further advantage in the use of multimetal cyanide compounds as catalysts consists in the distinctly increased space-time yield in the addition of the alkylene oxides.

Polyether alcohols can be prepared with the aid of DMC technology either in a batchwise or in a continuous process.

Continuous processes for preparing polyether alcohols using DMC catalysts are known. For instance, DD 203 735 describes a process for continuously preparing polyether alcohols using DMC catalysts, in which a starter substance which comprises an activated DMC catalyst is metered continuously into a tubular reactor, alkylene oxide is added once or more than once over the course of the tubular reactor and, at the end of the reactor, the finished polyether alcohol is withdrawn continuously. In this process, the activated starter substance has to be obtained in a separate process step in another reactor.

DD 203 734 describes a process for preparing low molecular weight alkylene oxide addition products which comprise an activated DMC catalyst. In this process, the catalyst is first activated with alkylene oxide and, after the reaction starts up, alkylene oxide and low molecular weight alcohol are metered into the reactor until the desired molecular weight has been attained.

WO 97/29146 describes a process for preparing polyether alcohols using DMC catalysts, in which the addition of alkylene oxides onto the H-functional starter substance is commenced in a reactor, and further starter substance and alkylene oxide are metered continuously into this reacting mixture. The finished polyether alcohol is withdrawn from the reactor after the addition.

WO 98/03571 describes a process for continuously preparing polyether alcohols using DMC catalysts. In this process, starter substance and alkylene oxide are fed continuously to a continuous reactor and the finished polyether alcohol is withdrawn continuously.

A disadvantage in all processes described for continuously preparing polyether alcohols is that the structure of the polyether chain cannot be varied. It is only possible to add on one alkylene oxide or a predefined mixture of alkylene oxides.

WO 00/14143 and WO 99/44739 describe DMC catalysts which are applied to solid supports or shaped to shaped bodies. By means of these catalysts, it is likewise possible to continuously prepare polyether alcohols, for example in the case of arrangement of the catalysts in a fixed bed. WO 99/44739 states that the reaction can be effected in a plurality of sections arranged in series. However, the preparation of the DMC catalysts in the configuration described in these documents is laborious, and the lifetimes of such supported catalysts are insufficient. Such processes have therefore not become established in industry.

For various fields of use of polyether alcohols prepared by means of DMC catalysts, modification of the polyether chain, especially at the chain end, is required. The polyetherols used for the preparation of flexible polyurethane foams typically have polyether chains having a mixture of ethylene oxide and propylene oxide. Especially for the use of the polyether alcohols in slabstock flexible foams, preference is given in the case of DMC polyether alcohols to the addition of propylene oxide at the chain end in order to adjust the reactivity of the polyether alcohols in the preparation of the foams. Such polyether alcohols are described, for example, in WO 01/16209.

For applications in the HR sector, in contrast, polyols having a high content of reactive primary OH end groups are needed. These are obtained in the case of use of potassium hydroxide as a catalyst by virtue of a block of ethylene oxide being metered in after a block of polypropylene oxide. This converts a portion of the secondary OH groups to primary OH groups. This procedure cannot be employed directly in the case of DMC technology, since uniform addition of ethylene oxide onto the secondary hydroxyl groups present does not succeed. Instead, a primary OH group, once it has formed, appears to react highly preferentially with further EO, so that opaque and improcessible products occur owing to incompatibilities.

In order to avoid these problems, the literature, for example U.S. Pat. No. 5,144,093, has proposed undertaking the ethoxylation by means of alkaline catalysis instead of with a DMC catalyst. The catalysts employed in this case are strong bases, preferably potassium hydroxide. Although this succeeds in adding on ethylene oxide uniformly, catalyst removal, for example by precipitation with acids or removal by means of adsorbents, is necessary, which leads to additional costs. One advantage of DMC catalysis, the lack of workup, is thus absent. Moreover, an additional reactor is necessary in order to prevent cross-contamination of the DMC by the bases. The preparation of the alkoxide by a distillation step leads to lengthening of the cycle times and requires additional apparatus, for example a column.

WO 01/44347 discloses a process with which an increase in the content of primary OH groups is also achieved under DMC catalysis. In this process, a change in the composition of a mixture of ethylene oxide and propylene oxide with time is undertaken. As a result, ethylene oxide is enriched toward the end of the metered addition, which is expressed in an increased content of primary OH groups. However, this process places high demands on the quality of the reaction control, since deviating closed-loop control of the two metered streams for ethylene oxide and propylene oxide results in too high a content of ethylene oxide in the mixture, which can, under some circumstances, have the consequence of the formation of cloudy by-products. The difficulties in the regulation technology are additionally increased by the metering rate of at least one alkylene oxide changing with time. Moreover, it has to be ensured that the two metered streams are ended simultaneously at the end of the reaction in order to prevent overdosages. When further propylene oxide is metered in, some of the primary OH groups formed can be converted back to secondary OH groups. Further metering of ethylene oxide can bring about the formation of cloudy by-products.

It was therefore an object of the invention to develop an industrially realizable and robust process with which a high content of primary OH groups in the polyether alcohols is attained, by virtue of which the products are suitable for use in HR formulations.

This object is achieved by a process for preparing polyether alcohols by means of DMC catalysts, in which, in a first step, a precursor is prepared continuously or batchwise, to which mixtures of ethylene oxide and propylene oxide are added on in a second step in a tubular reactor, the ratio of ethylene oxide and propylene oxide in the mixtures metered in at the different metering points being different, and the mixture metered in in the second step, at least at the last metering point, comprising at least 40% by weight of ethylene oxide.

The invention accordingly provides a process for preparing polyether alcohols by catalytically adding ethylene oxide and propylene oxide onto H-functional starter substances using DMC catalysts, which comprises, in a first step, adding propylene oxide or a mixture of propylene oxide and ethylene oxide onto H-functional starter substances and transferring the product thus formed into a tubular reactor in which mixtures of ethylene oxide and propylene oxide are metered in at least two metering points, the proportions of ethylene oxide and propylene oxide in the mixtures metered in in the first and in the second step being different, the proportions of ethylene oxide and propylene oxide in the mixtures metered in at least two metering points in the second step being different, and the mixture metered in in the second step, at least at the last metering point, comprising at least 40% by weight of ethylene oxide.

The number of metering points is preferably from 2 to 10, more preferably from 3 to 8 and in particular from 4 to 6. The metering points are mounted on the flow tube such that at least two of the metering points are mounted successively in the flow direction of the tubular reactor. As described, the mixture metered in the second step, at least at the last metering point, comprises at least 40% by weight of ethylene oxide.

The metering points are preferably configured as nozzles. The alkylene oxides are fed to the nozzles preferably via pumps, the alkylene oxides being mixed upstream of the pumps and metered in as a mixture, or being fed to the nozzles via separate pumps.

To ensure plug flow within the tubular reactor, it is advantageous, upstream of the metering points for the alkylene oxides, to install mixers which work by the "split and recombine" principle. Preference is given to using mixers without moving parts, also known as static mixers. For example, it is possible to use static mixers from Sulzer.

The composition of the mixtures of ethylene oxide and propylene oxide metered in in the second step may in principle be the same or different at the different metering points.

It is thus possible in principle to meter in a mixture of ethylene oxide and propylene oxide with identical compositions in order to obtain products which comprise internal ethylene oxide units, so that these products can be used for the production of slabstock flexible foams. However, it is preferred to increase the content of ethylene oxide in the mixtures metered in toward the end of the reactor of the second stage, in order thus to obtain products which, toward the chain end, have an increased proportion of ethylene oxide, which leads to reactive polyols. These products are used for the production of molded flexible foams.

It is crucial that the tubular reactor of the second stage has sufficiently high heat removal performance. This can be achieved by configuring the reactor, for example, as a tube bundle reactor. The heat removal can be achieved, inter alia, by evaporative cooling. It also has to be ensured that turbulent flow prevails in the reactor of the second stage, which can be realized either by high flow rates or by the use of mixing elements or beds.

As already stated, the first step of the process according to the invention can be carried out continuously or batchwise.

In the batchwise method of the first stage of the process according to the invention, preferred reactors are stirred tanks.

In the batchwise configuration of the first stage of the process according to the invention, the product of the first stage is preferably transferred to a vessel from which the product is withdrawn continuously and fed to the second stage.

In the continuous method of the first stage of the process according to the invention, preferred reactors are continuous stirred tanks, tubular reactors or flow or loop reactors.

It is also possible to use jet loop reactors with gas phase and external heat exchangers, as described, for example, in EP 419419 or internal heat exchanger tubes, as described in WO 01/628826. It is also possible to use gas phase-free loop reactors.

In the course of metering of the reactants, good distribution of the reactants, i.e. of the alkylene oxides, starters and catalyst suspension, is necessary. In stirred tanks, this can be done by the use of ring distributors which are installed below the stirrer or between the first and the second stirrer level.

Such reactors are described, for example, in JP H6-16806, DD 207 253, WO 01/62826, WO 01/62825 and WO 01/62824.

In a preferred embodiment of the process according to the invention, continuous stirred tanks are used in the first stage of the process, especially those having an external heat exchanger.

In this case, in a known manner, starter substance, alkylene oxides and DMC catalysts are fed continuously to the reactor and the end product is withdrawn from the first stage and transferred to the tubular reactor.

Between the two reaction stages, it is possible, for example, to install additional heat exchangers. It is also possible to install a device with which additional catalyst which may be different from the catalyst used in the first stage can be metered in. Finally, additional assistants such as stabilizers or solvents may be metered in.

If necessary, a stripping unit may also be installed between the two stages in order to remove residues of the alkylene oxides from the intermediate. This stripping unit may be configured, for example, in the form of a column or of a flash stripper.

In a further embodiment, the product is stored between the two reaction stages and only later metered into the tubular reactor.

The polyether alcohols prepared by the process according to the invention preferably have a content of ethylene oxide of from 3 to 50% by weight based on the weight of the polyether alcohol.

Preferably between 40 and 98% by weight, more preferably from 50 to 95% by weight and in particular from 60 to 90% by weight of the total amount of alkylene oxides used is used in the first process step, and the remainder of the alkylene oxide in the second process step, the amounts of the alkylene oxides used in the two stages of the process according to the invention adding up to 100% by weight.

In the first process step, preferably propylene oxide or more preferably a mixture of ethylene oxide and propylene oxide is used. The ratio of propylene oxide to ethylene oxide is preferably between PO:EO=30:70 and PO:EO=98:2.

Depending on the requirement, further DMC catalyst may be added to the product from the first process stage before it is transferred to the tubular reactor. It is equally possible to add further catalyst, especially DMC catalyst, in the course of the second stage of the process according to the invention.

After it leaves the tubular reactor of the second stage of the process according to the invention, the end product is worked up. The workup includes, for example, the removal of volatile constituents which may also act as odorants, typically by vacuum distillation, steam stripping or gas stripping, and/or other methods of deodorization. It is advantageous in this context to carry out the stripping immediately after the metered addition of the alkylene oxides, but if at all possible not later than 12 hours after the end of the metered addition of the alkylene oxides. If required, a filtration may also be effected. Volatile secondary components may be removed either batchwise or continuously. In the process according to the invention, preference is given to continuous removal of the odorants.

It is possible to remove the catalyst from the polyether alcohol. However, for most fields of use, it can remain in the polyether alcohol. It is possible in principle, although not preferred, to remove the DMC catalyst and to reuse it in step a), as described, for example, in WO 01/38421. However, this procedure is usually too costly and inconvenient for the industrial-scale preparation of polyether alcohols.

It is also customary to stabilize the polyether alcohol against thermooxidative degradation. This is typically done by the addition of stabilizers, usually sterically hindered phenols and/or amines.

Useful starter substances are H-functional compounds. In particular, alcohols having a functionality of from 1 to 8, preferably from 2 to 8, are used. To prepare polyether alcohols which are used as feedstocks for flexible polyurethane foams, the starter substances used are preferably alcohols having a functionality of from 2 to 6, in particular of 2 and 3. Examples are glycerol, diglycerol, butanediol, diethylene glycol, triethylene glycol, dipropylene glycol, tripropylene glycol, sorbitol, trimethylolpropane and castor oil. In the case of adding-on of the alkylene oxides by means of DMC catalysts, it is advantageous, together with or in place of the alcohols mentioned, to use their reaction products with alkylene oxides, especially propylene oxide. Especially in the batchwise method and at the start of the reaction in the continuous method of the first process stage, preference is given to using alkoxylation products of the alcohols in order to suppress delays in the start of the reaction. Such compounds preferably have a molar mass up to a maximum of 1000 g/mol. In the preparation of these reaction products, the alkylene oxides can be added on with any catalysts, for example with basic catalysts. However, a thorough workup of the alkoxylation products is required in this case, since even traces of bases deactivate the DMC catalyst.

The DMC catalysts used for the process according to the invention are known and are described, for example, in EP 743 093, EP 755 716, EP 862 947, EP 862 997 or EP 1 021 453. The catalysts may be amorphous or crystalline. Among the crystalline DMC catalysts, preference is given to those having a monoclinic crystal structure.

The catalyst is used preferably in an amount of from 15 to 100 ppm, in particular in an amount of from 20 to 80 ppm, basing each case on the total mass of the polyether alcohol.

In principle, it is possible to work in both stages of the process according to the invention with the same end concentration of DMC catalyst. Preference is given to continuing in the second stage with the amount of DMC catalyst remaining in the precursor. In a further embodiment, it is possible, as stated, to add further DMC catalyst to the precursor upstream of the second stage. This can be done at one or more points.

The catalyst is preferably metered only once into the first reactor. The amount of catalyst should be such that there is sufficient catalytic activity for both process steps. The catalyst is preferably metered in in the form of an about 5% catalyst suspension. The catalyst suspension medium may, for example, be the product from the first step or the end product of the process according to the invention. The molecular weight of the polyether-alcohol used for the suspension should be identical to or less than the molar mass of the end product of the process in order to rule out inhomogeneities in the end product. For the same reason, the composition of the polyether alcohol used for the suspension should be identical to the end product of the process.

In both steps, the addition of the alkylene oxides is effected under the customary conditions, at temperatures in the range from 60 to 180° C., preferably between 90 and 140° C., in particular between 100 and 130° C., and pressures in the range from 0 to 20 bar, preferably in the range from 0 to 10 bar and in particular in the range from 0 to 5 bar. The two process steps may be performed at identical or different temperatures. The mixture of starter substance and DMC catalyst initially charged in the reactor at the start of the reaction can, before the start of the metered addition of the alkylene oxides, be pretreated by stripping in accordance with the teaching of WO 98/52689.

The polyether alcohols preferred for the application sector in HR foams have OH numbers between 60 and 18 mg KOH/g, preferably between 40 and 20 mg KOH/g. The polyols comprise between 1 and 30%, preferably between 5 and 25% ethylene oxide. These polyols preferably have contents of primary hydroxyl groups between 5 and 70%, preferably between 10 and 60%. With D values between 1.1 and 1.5, the molar mass distributions are narrow. As usual in the case of polyether alcohols, the viscosities are dependent upon OH number, functionality and the content of ethylene oxide. At OH numbers around 25 mg KOH/g and a content of ethylene oxide of 15% by weight, viscosities around 1500 mPas are obtained at a functionality of three.

The functionalities of the polyols are of crucial importance for the processability and the foam properties. On the basis of the functionalities of KOH-based HR polyols, foam examinations have found functionalities of from 2.2 to 2.9 to be viable in the case of use of polyols prepared by the process according to the invention. These functionalities can be established, for example, by starter mixtures of glycerol with diols or monools. Especially the use of mixtures of diol and triol, for example diethylene glycol and glycerol, has been found to be very advantageous for use in the foam. This is surprising, since there are fundamental structural differences between KOH and DMC polyols in this regard. The monools in KOH polyols are formed continuously during the reaction and have a broad molecular weight distribution. When DMC catalysts are used, it is not possible to achieve this broad molecular weight distribution, since identical molecular weights result owing to the differential catalysis. However, the use of triol/diol mixtures as a starter lead to polyols with which analogous foam parameters can be realized.

The polyether alcohols prepared by the process according to the invention are converted to polyurethanes, preferably flexible foams, especially HR foams, by customary processes by reaction with polyisocyanates in the presence of the customary catalysts, gluing agents and assistants and/or additives. The foams can be produced as a slabstock foam or as a molded foam. The foams thus produced find use as cushion material especially in the furniture industry and the motor vehicle industry.

The polyether alcohols prepared by the process according to the invention can be used without any problem for producing molded foams, especially HR foams. The properties of the foams thus produced corresponds to those of foams which have been produced using conventional polyether alcohols.

The process according to the invention is simple to carry out and insensitive to faults.

The invention will be illustrated in detail using the examples which follow.

EXAMPLE 1

Comparative

First, a propoxylate was prepared from glycerol and diethylene glycol with an OH number of 141 mg KOH/g using potassium hydroxide solution as a catalyst. To this end, 15.77 g of glycerol and 6.06 kg of diethylene glycol were initially charged in a pressure-resistant reactor (20 barg) and 750 g of solid potassium hydroxide were then metered in. At a pressure of 10 mbar, dehydration was effected at 120° C. for 4 h. After the vacuum had been broken with nitrogen, 228 kg of propylene oxide were metered in at 120° C. within 9 h. After the postreaction phase had ended, the crude polyol was neutralized by metering in 2% water and 5% Macrosorb®, based in each case on the overall batch. The water was removed under reduced pressure down to a water content of 0.02% by weight and the solids were removed by means of a depth filter. The product had an OH number of 141.3 mg KOH/g; the alkalinity was below the detection limit of 1 ppm of $K^+$.

This propoxylate was also used to suspend the DMC catalyst used, prepared according to Example 1 of EP862947. 10 kg of propoxylate were initially charged, the moist filtercake of the DMC catalyst was metered in and the suspension was dispersed by means of an UltraTurrax® for approx. 20 min. Subsequently, the suspension was dried under reduced pressure (approx. 4 h, 10 mbar). The dry suspension had a catalyst content of 6.63% by mass.

9.75 kg of the propoxylate prepared by means of KOH catalysis were initially charged in a 250 kg reactor (max 10 bar) and 0.377 kg of the suspension of the DMC catalyst was metered in. The reaction was inertized by means of nitrogen and heated to 130° C. Subsequently, glycerol/DEG mixture (glycerol: 2.51 kg, DEG: 0.966 kg) and propylene oxide (74.27 kg) were metered in parallel within 4 hours. This was followed by a pure polypropylene oxide block (97.47 kg) which was metered in within 2 h. This intermediate had an OH number of 37.8 mg KOH/g.

The resulting reaction product was transferred to a flow tube with a length of 1.79 m in total and an internal diameter of 25 mm. The reactor consisted of a total of 7 individual jacketed tubes each of length 256 mm which were thermally controllable individually by means of cryostats. To ensure plug flow, individual SMX static mixers from Sulzer were installed internally. Downstream of the static mixers, the alkylene oxides were fed in, these having been introduced into the flow tube reactor via nozzles. The alkylene oxides were conveyed by means of separate HPLC pumps in each case.

The propoxylate having the OH number of 37.8 mg KOH/g was metered by means of a gear pump at a metering rate of 1.5 kg/h at a temperature of 130° C. into the flow tube. At the five metering points, constant ratios of ethylene oxide and propylene oxide were established. The metering rates of propylene oxide and ethylene oxide at each injection point were 67.7 g/h (propylene oxide) and 42.3 g/h (ethylene oxide). At the last injection point, the amount metered was reduced in order to be able to attain the necessary OH number; the ratio of PO to EO remained constant. No local temperature increase was detectable. The product at the end of the flow tube reactor was collected in a degassing vessel (10 l) which was operated at a pressure of 200 mbara and a temperature of 130° C. From this, the degassed product was sucked batchwise into a further degassing vessel (10 l, p=10 mbara, T=130° C.) and finally emptied. The finished product had an OH number of 28.1 mg KOH/g, a viscosity of 970 mPas and a content of primary OH groups of 14 mol %. The measurement of the EO content by means of $^1$H NMR spectroscopy gave a value of 10% by mass.

EXAMPLE 2

Inventive

The same apparatus and the same reagents as in Example 1 were used. However, locally different ratios of ethylene oxide and propylene oxide which are summarized in Table 1 were metered in in the flow tube reactor. The profile was adjusted such that the proportion of ethylene oxide increased toward the end of the metered addition.

The resulting polyol had an OH number of 28.2 mg KOH/g, a primary OH content of 21 mol % and a viscosity of 1102 mPas. the polyol was clear and could be processed without any problem into HR foam formulations.

EXAMPLE 3

Comparative

The same apparatus as in Example 1 was used.

First, a propoxylate was prepared from glycerol and diethylene glycol with an OH number of 141 mg KOH/g using potassium hydroxide solution as a catalyst. To this end, 15.77 g of glycerol and 6.06 kg of diethylene glycol were initially charged in a pressure-resistant reactor (20 barg) and 750 g of solid potassium hydroxide were then metered in. At a pressure of 10 mbara, dehydration was effected at 120° C. for 4 h. After the vacuum had been broken with nitrogen, 228 kg of propylene oxide were metered in at 120° C. within 9 h. After the postreaction phase had ended, the crude polyol was neutralized by metering in 2% water and 5% Macrosorb®, based in each case on the overall batch. The water was removed under reduced pressure down to a water content of 0.02% by weight and the solids were removed by means of a depth filter. The product had an OH number of 141.3 mg KOH/g; the alkalinity was below the detection limit of 1 ppm of K.

This propoxylate was used to suspend the DMC catalyst, prepared according to Example 1 of EP862947. 10 kg of propoxylate were initially charged, the moist filtercake was metered in and the suspension was dispersed by means of an UltraTurrax® for approx. 20 min. Subsequently, the suspension was dried under reduced pressure at 10 mbara for approx. 4 hours. The dry suspension had a catalyst content of 6.63% by mass.

9.75 kg of the propoxylate prepared by means of KOH catalysis were initially charged in a 250 kg reactor (max. 10 barg) and 0.377 kg of the DMC suspension was metered in. The reaction was inertized by means of nitrogen and heated to 130° C. Subsequently, glycerol/diethylene glycol mixture (glycerol: 2.51 kg, DEG: 0.966) and propylene oxide (74.27 kg) were metered in parallel within 4 hours. This was followed by a pure polypropylene oxide block (122.49 kg) which was metered in within 2 h. This intermediate had an OH number of 30.08 mg KOH/g.

The same flow tube apparatus as in Example 1 was used.

The propoxylate prepared with the OH number of 30.08 mg KOH/g was metered by means of a gear pump with a flow rate of 1.5 kg/h into the flow tube at a temperature of 130° C. At the five metering points, constant EO/PO ratios were established. The metering rates of PO and EO at each injection point were a constant 24.0 g/h (PO) and 56.0 g/h (EO). At the last injection point, the amount metered was reduced in order to be able to attain the necessary OH number; the ratio of PO to EO remained constant. No local temperature increase was detectable. The product at the end of the flow tube reactor was collected in a degassing vessel (10 l) which was operated at a pressure of 200 mbara and a temperature of 130° C. From this, the degassed product was sucked batchwise into a further degassing vessel (10 l, p=10 mbara, T=130° C.) and finally emptied. The finished product had an OH number of 28.3 mg KOH/g, a viscosity of 1403 mPas and a content of primary OH groups of 21 mol %. The measurement of the EO content by means of $^1$H NMR spectroscopy gave a value of 13.7% by mass. The product was very cloudy and use thereof in the HR foam led to foam collapse.

EXAMPLE 4

Inventive

The same apparatus and the same reagents as in Example 3 were used. However, locally different ratios of ethylene oxide and propylene oxide which are summarized in Table 1 were metered in in the flow tube reactor. The profile of the metering was adjusted such that the proportion of EO increased toward the end of the metering.

The resulting polyol had an OH number of 27.8 mg KOH/g, a content of primary hydroxyl groups of 31 mol %, an ethylene oxide content of 14.2% by mass and a viscosity of 1485 mPas.

The clear polyol was processible into HR foam formulations without any problems.

EXAMPLE 5

Inventive

A continuous stirred tank reactor with a volume of 2 liters was used. The glycerol/diethylene glycol mixture and the propylene oxide were metered in via separate immersed tubes. The DMC catalyst was suspended in the precursor which had been prepared by means of semibatch technology according to Example 1 and had an OH number of 37.8 mg KOH/g. This gave a concentration of the DMC catalyst of 6.21%. Starter, catalyst suspension and propylene oxide were metered in by means of HPLC pumps. The flow tube reactor in the second part of the reaction corresponded to that which was used in Examples 1-4.

For the start of the reaction, the reactor was charged with 1.3 kg of the precursor which had been prepared by means of semibatch technology (see Example 1) and had an OH number of 37.8 mg KOH/g, and heated to 120° C. Subsequently, the metering of the catalyst suspension was switched on first (3.26 g/h). Then, first propylene oxide (1.462 kg/h) and finally starter (glycerol 25.3 g/h, diethylene glycol 9.73 g/h) were metered in. Once a fill level of approx. 1.5 liters had been attained in the reactor, the outlet valve was opened and the reactor contents were conveyed into the tubular reactor via a gear pump. The flow was controlled by means of a mass flow controller in the reactor outlet. The comparison of the feeds with the amount of product discharged was used to control the fill level.

The tubular reactor was operated as in Example 2, i.e. the relative concentrations of ethylene oxide increased at the five metering points in accordance with Table 1.

The clear product had an OH number of 27.5 mg KOH/g, a content of primary hydroxyl groups of 22 mol %, an ethylene oxide content of 10.5% by mass and a viscosity of 1521 mPas.

There were no problems in the processing in the HR foam.

TABLE 1

Compositions of the AO metered streams at the metering points.

| Experiment | Metering rate at metering points # in g/h | | | | | | | | | |
|---|---|---|---|---|---|---|---|---|---|---|
| | 1 | | 2 | | 3 | | 4 | | 5 | |
| Example 1 | PO | 69.7 | PO | 69.7 | PO | 69.7 | PO | 69.7 | PO | 53.5[1] |
| | EO | 42.3 | EO | 42.3 | EO | 42.3 | EO | 42.3 | EO | 33.46[1] |
| Example 2 | PO | 116.8 | PO | 90.8 | PO | 64.9 | PO | 38.9 | PO | 13.0 |
| | EO | 40.5 | EO | 40.5 | EO | 40.5 | EO | 40.5 | EO | 40.5 |
| Example 3 | PO | 24.0 | PO | 24.0 | PO | 24.0 | PO | 24.0 | PO | 16.5[1] |
| | EO | 56.0 | EO | 56.0 | EO | 56.0 | EO | 56.0 | EO | 38.5[1] |
| Example 4 | PO | 40.5 | PO | 31.5 | PO | 22.5 | PO | 13.5 | PO | 4.5 |
| | EO | 10.5 | EO | 31.5 | EO | 52.5 | EO | 73.5 | EO | 94.5 |
| Example 5 | PO | 116.8 | PO | 90.8 | PO | 64.9 | PO | 38.9 | PO | 13.0 |
| | EO | 40.5 | EO | 40.5 | EO | 40.5 | EO | 40.5 | EO | 40.5 |

[1]Reduction of the mass flow rates to attain the target OH number

What is claimed is:

1. A process for preparing polyether alcohols by adding alkylene oxides onto H-functional starter substances using DMC catalysts, which comprises, in a first step, adding propylene oxide or a mixture of propylene oxide and ethylene oxide onto H-functional starter substances and, in a second step, transferring the product thus formed into a tubular reactor in which mixtures of ethylene oxide and propylene oxide are metered in at at least two metering points, the proportions of ethylene oxide and propylene oxide in the mixtures metered in in the first and in the second step being different, the proportions of ethylene oxide and propylene oxide in the mixtures metered in at at least two metering points in the second step being different, and the mixture metered in in the second step, at least at the last metering point, comprising at least 40% by weight of ethylene oxide.

2. The process according to claim 1, wherein the number of metering points in the second step is from 2 to 10.

3. The process according to claim 1, wherein the number of metering points in the second step is from 3 to 8.

4. The process according to claim 1, wherein the number of metering points in the second step is from 4 to 6.

5. The process according to claim 1, wherein the proportion of ethylene oxide in the mixtures metered in in the second step increases with continuing reaction.

6. The process according to claim 1, wherein static mixers are installed into the tubular reactor upstream of the metering points for the alkylene oxides in the second step.

7. The process according to claim 1, wherein the polyether alcohols have a content of ethylene oxide of from 3 to 50% by weight.

8. The process according to claim 1, wherein from 40 to 98% by weight of the total amount of alkylene oxide is used in the first step.

9. The process according to claim 1, wherein the first step is carried out continuously.

10. The process according to claim 1, wherein the first step is carried out batchwise.

11. The process according to claim 1, wherein the polyether alcohol formed after the second step is carried out has a content of primary OH groups of from 21 to 31 mol %.

12. The process according to claim 1, wherein from 60 to 90% by weight of the total weight of the propylene oxide and the ethylene oxide is metered in in the first step.

13. The process according to claim 1, wherein the polyether alcohol formed after the second step is carried out has a greater proportion of ethylene oxide units at the chain end in comparison to propylene oxide units.

14. The process according to claim 1, wherein the weight ratio of the ethylene oxide to the propylene oxide metered in at the last metering point is from 94.5:4.5 to 38.5:16.5 wt %.

15. The process according to claim 1, further comprising:
after the second step is carried out, reacting the polyether alcohol with one or more polyisocyanates to form a polyurethane.

16. The process according to claim 1, wherein the mixture metered in in the second step, at least at the last metering point, comprises from 40.5 to 94.5% by weight of ethylene oxide.

17. The process according to claim 1, wherein, in the first step, the propylene oxide is metered in in an amount that is greater than the amount of the ethylene oxide metered in in the first step.

* * * * *